US009060163B1

(12) United States Patent
Lee et al.

(10) Patent No.: US 9,060,163 B1
(45) Date of Patent: Jun. 16, 2015

(54) SIGNAL ADAPTIVE FILTERING METHOD, SIGNAL ADAPTIVE FILTER AND COMPUTER READABLE MEDIUM FOR STORING PROGRAM THEREFOR

(71) Applicant: SAMSUNG ELECTRONICS CO., LTD., Suwon-si (KR)

(72) Inventors: Yung-Iyul Lee, Seoul (KR); Hyun-Wook Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/665,841

(22) Filed: Mar. 23, 2015

Related U.S. Application Data

(60) Continuation of application No. 14/560,572, filed on Dec. 4, 2014, which is a continuation of application No. 14/164,875, filed on Jan. 27, 2014, now Pat. No. 8,942,296, which is a continuation of application No.

(Continued)

(30) Foreign Application Priority Data

Jul. 16, 1997 (KR) .................. 10-1997-0033253

(51) Int. Cl.
H04N 7/12 (2006.01)
H04N 19/00 (2014.01)
G06T 5/00 (2006.01)

(52) U.S. Cl.
CPC ...... H04N 19/00 (2013.01); G06T 2207/20008 (2013.01); G06T 5/00 (2013.01)

(58) Field of Classification Search
CPC ............................ H04N 19/117; H04N 19/80
USPC ........................................ 375/240.24, 240.29
See application file for complete search history.

(56) References Cited

U.S. PATENT DOCUMENTS 5,198,900 A 3/1993 Tsukagoshi
5,241,395 A 8/1993 Chen
(Continued)

FOREIGN PATENT DOCUMENTS

CA 2 440 007 A1 1/1999
CA 2296536 A1 1/1999
(Continued)

OTHER PUBLICATIONS

Ida Takashi et al., "A denoising filter in an MC-DCT coding method", Institute of Electronics, Information and Communication Engineers, Japan, Mar. 5, 1990. p. 58.

(Continued)

Primary Examiner — Sath V Perungavoor
Assistant Examiner — Jeffery Williams
(74) Attorney, Agent, or Firm — Sughrue Mion, PLLC

(57) ABSTRACT

A signal adaptive filtering method for reducing blocking effect and ringing noise, a signal adaptive filter, and a computer readable medium. The signal adaptive filtering method capable of reducing blocking effect and ringing noise of image data when a frame is composed of blocks of a predetermined size includes the steps of: (a) generating blocking information for reducing the blocking effect and ringing information for reducing the ringing noise, from coefficients of predetermined pixels of the upper and left boundary regions of the data block when a frame obtained by deconstructing a bitstream image data for inverse quantization is an intraframe; and (b) adaptively filtering the image data passed through inverse quantization and inverse discrete cosine transform according to the generated blocking information and ringing information. Therefore, the blocking effect and ringing noise can be eliminated from the image restored from the block-based image, thereby enhancing the image restored from compression.

1 Claim, 6 Drawing Sheets

Related U.S. Application Data

13/948,057, filed on Jul. 22, 2013, now Pat. No. 8,638,864, which is a continuation of application No. 11/649,275, filed on Jan. 4, 2007, now Pat. No. 8,494,048, which is a continuation of application No. 10/669,729, filed on Sep. 25, 2003, now Pat. No. 7,492,823, which is a division of application No. 09/462,805, filed as application No. PCT/KR98/00169 on Jun. 18, 1998, now Pat. No. 6,631,162.

(56) References Cited

U.S. PATENT DOCUMENTS

| | | | |
|---|---|---|---|
| 5,365,271 A | 11/1994 | Asano | |
| 5,367,629 A | 11/1994 | Chu et al. | |
| 5,402,958 A | 4/1995 | Mahaney | |
| 5,422,964 A | 6/1995 | Devimeux et al. | |
| 5,475,434 A | 12/1995 | Kim | |
| 5,495,538 A | 2/1996 | Fan | |
| 5,563,662 A | 10/1996 | Kishi | |
| 5,610,729 A | 3/1997 | Nakajima | |
| 5,724,098 A | 3/1998 | Murakami et al. | |
| 5,737,451 A | 4/1998 | Gandhi et al. | |
| 5,787,210 A | 7/1998 | Kim | |
| 5,852,682 A | 12/1998 | Kim | |
| 5,920,356 A | 7/1999 | Gupta et al. | |
| 5,974,197 A | 10/1999 | Lee et al. | |
| 6,000,736 A | 12/1999 | Leon et al. | |
| 6,081,551 A | 6/2000 | Etoh | |
| 6,259,823 B1 | 7/2001 | Lee et al. | |
| 7,929,614 B2 * | 4/2011 | Cho et al. | 375/240.25 |

FOREIGN PATENT DOCUMENTS

| | | |
|---|---|---|
| EP | 0 590 922 A2 | 4/1994 |
| EP | 0 721 286 A2 | 7/1996 |
| EP | 0 781 053 A2 | 6/1997 |
| EP | 0779742 A2 | 6/1997 |
| EP | 0808068 A2 | 11/1997 |
| EP | 1351508 A2 | 10/2003 |
| JP | 3-267888 | 11/1991 |
| JP | 5-316361 | 11/1993 |
| JP | 6-343169 | 12/1994 |
| JP | 7-038762 A | 2/1995 |
| JP | 7-212759 | 8/1995 |
| JP | 8-149470 | 6/1996 |
| JP | 8-251591 | 9/1996 |
| JP | 8265762 | 10/1996 |
| JP | 8-307870 | 11/1996 |
| JP | 9-121358 A | 5/1997 |
| JP | 10-191335 A | 7/1998 |
| RU | 2051428 | 12/1995 |
| RU | 2051428 C1 | 12/1995 |
| SU | 1438023 A | 11/1988 |
| SU | 1478377 A1 | 7/1989 |
| SU | 1646074 A | 4/1991 |
| WO | 91/14340 A1 | 9/1991 |
| WO | 99/22509 | 5/1999 |

OTHER PUBLICATIONS

Canadian Office Action, dated Sep. 13, 2010, issued in Application No. 2,570,723.

Office Action dated May 27, 2011, from the Canadian Intellectual Property Office in counterpart Canadian Application No. 2,440,013.
European Communication issued in corresponding European Application No. 06101554.1 on Jul. 29, 2011.
Communication dated Nov. 2, 2011, issued by the Canadian Intellectual Property Office in corresponding Canadian Patent Application No. 2,570,723.
Communication published Dec. 21, 2011 issued by the European Patent Office in counterpart European Patent Application No. 07119167.0.
Yung-Lyul Lee, et al: "Results of Core Experiment N1 (Deblocking and Deringing filter)", 41. MPEG Meeting; Oct. 27, 1997-Oct. 31, 1997, No. M2723, Oct. 19, 1997, XP030031997.
Telenor R&D, et al.: "Changes to the deblocking filter option", 15. LBC Meeting; Nov. 11, 1996-Nov. 14, 1996; Atlanta, No. LBC-96-293, Nov. 11, 1996, XP030028988.
Communication dated Dec. 18, 2012 issued by the European Patent Office in counterpart European Patent Application No. 04007917.0.
Communication dated Dec. 18, 2012 issued by the European Patent Office in counterpart European Patent Application No. 06101554.1.
Communication dated Dec. 17, 2012 issued by the European Patent Office in counterpart European Patent Application No. 07 119 167.0.
Communication dated Mar. 26, 2013, issued by the Canadian Intellectual Property Office in counterpart Canadian Application No. 2,570,723.
Russian Notice of Allowance, dated Mar. 8, 2005, issued in Application No. 2003104619/09.
Office Action, dated May 8, 2010 from the Brazilian Patent Office in counterpart application PI9811111-6.
Hu J et al.: "Removal of Blocking and Ringing Artifacts in Transform Coded Images", Acoustics, Speech, and Signal Processing, 1997. Icassp-97., 1997 IEEE International Conference on Munich, Germany Apr. 21-24, 1997, Los Alamitos, Ca, USA, IEEE Comput. Soc, US (Apr. 21, 1997), 2565-2568.
Communication regarding European Search report for Appln. No. EP 03005607, EPO, Nov. 11, 2003.
Communication pursuant to Article 96 (2) EPC, EPO, Nov. 11, 2003.
Webb "Postprocessing to Reduce Blocking Artifacts for Low Bit-Rate Video Coding Using Chrominance Information," Proeeedings of the International Conference on Image Processing, (Sep. 16-19, 1996), vol. 1, pp. 9-12.
Lynch, William E. et al. Post Processing Transform Coded Images Using Edges, Int'l Conf. on Acoustics, Speech, and Signal Processing, 1995, vol. 4, pp. 2323-2326.
Nov. 9, 2004 Office Action for German Patent Applicaiton No. 198 82 541.2-53.
Communication dated Aug. 28, 2013, issued by the Brazilian Patent Office in counterpart Brazilian Application No. PI9816272-1.
Notice of Allowance for U.S. Appl. No. 13/948,057 mailed on Jan. 6, 2014.
Examiner's Report for Canadian Patent Application No. 2,440,013 dated Sep. 12, 2006.
Office Action for German Patent Application No. 19882541.2 dated Jan. 21, 2008.
Search Report for Spanish Patent Application No. 200250065 dated Feb. 18, 2005.
Search Report for Spanish Patent Application No. 200350066 dated May 23, 2007.
Office Action in U.S. Appl. No. 14/164,875 mailed on Jun. 13, 2014.
Notice of Allowance in U.S. Appl. No. 14/164,875 mailed on Sep. 17, 2014.

* cited by examiner

SIGNAL ADAPTIVE FILTERING METHOD, SIGNAL ADAPTIVE FILTER AND COMPUTER READABLE MEDIUM FOR STORING PROGRAM THEREFOR

CROSS-REFERENCE TO RELATED APPLICATIONS

This is a continuation of U.S. application Ser. No. 14/560,572, filed Dec. 4, 2014, which is a continuation of U.S. application Ser. No. 14/164,875 (now U.S. Pat. No. 8,942,296) filed on Jan. 27, 2014, which is a continuation of application Ser. No. 13/948,057 (now U.S. Pat. No. 8,638,864), filed Jul. 22, 2013, which is a continuation of application Ser. No. 11/649,275 (now U.S. Pat. No. 8,494,048), filed Jan. 4, 2007, which is a continuation of application Ser. No. 10/669,729 (now U.S. Pat. No. 7,492,823) filed Sep. 25, 2003, which is a divisional of application Ser. No. 09/462,805 (now U.S. Pat. No. 6,631,162), filed Jan. 14, 2000, which is a National Stage Application filed under §371 of PCT Application No. PCT/KR 98/00169, filed Jun. 18, 1998, which claims the benefit of Korean Patent Application No. 10-1997-0033253, filed Jul. 16, 1997, the entire disclosures of which are hereby incorporated by reference.

TECHNICAL FIELD

The present invention relates to data filtering, and more particularly, to a signal adaptive filtering method for reducing blocking effect and ringing noise, a signal adaptive filter and a computer readable medium for storing a program therefor.

BACKGROUND ART

Generally, picture encoding standards such as MPEG of the International Standardization Organization (ISO) and H.263 recommended by the International Telecommunication Union (ITU) adopt block-based motion estimation and discrete cosine transform (DCT) blocks. When an image is highly compressed, the block-based coding may cause the well-known blocking effect. A typical blocking effect is grid noise in a homogeneous area in which adjacent pixels have relatively similar pixel values. Another blocking effect is staircase noise which has a staircase shape and is generated along the edges of the image. Also, ringing noise is a typical Gibb's phenomenon occurring by truncation when the coefficients of the DCT are quantized so as to highly compress the image.

Grid noise shows traces of the block-based process at the edges between blocks when the compressed data is displayed on a screen after being restored. Thus, one can identify the edges between blocks. Also, staircase noise has a staircase shape at the edges of the image, so that one can notice a bumpy edge on the image. Also, one can notice overlapping of images with a predetermined interval due to the ringing noise.

In order to reduce the blocking effect and the ringing noise occurring when block-based coding is performed, several methods have been suggested. According to H.261 encoding, a simple 3×3 low-pass filter (LPF) is used as a loop filter to reduce the blocking effect ["*Video Codec for Audiovisual Services at Px62 kbit/s*", CCITT Recommendation H.261, Dec. 14, 1990]. Also, a simple edge loop filter has been suggested so as to reduce the blocking effect and mosquito noise [G. Bjontegaard, "A Simple Edge Loop Filter to Reduce Blocking and Mosquito Noise", ISO/IEC JTC1/Sc29/WG11MPEG96/0617, January, 1996, and "A Simple Edge Loop Filter to Reduce Blocking and Mosquito Noise", ITU SC15 LBC Expert Group ITU-LBC-96032, January, 1996]. The edge loop filter makes linear values of two pixels adjacent to the block boundary and replaces the two pixel values by the linearized values. Such edge loop filter can reduce the blocking effect but not the ringing noise. In order to reduce the ringing noise, a non-linear filter using a binary index has been suggested [Y. Itoh, "*Detail Preserving Nonlinear Filter using Binary Index*," ISO/IEC JTC1/SC29/WG11 MPEG95/0357, November, 1995]. However, the non-linear filter cannot reduce the blocking effect.

DISCLOSURE OF THE INVENTION

To solve the above problems, it is an object of the present invention is to provide an signal adaptive filtering method for reducing blocking effect and ringing noise in high compression encoding, a signal adaptive filter, and a computer readable medium.

According to an aspect of the present invention, there is provided a signal adaptive filtering method capable of reducing blocking effect and ringing noise of image data when a frame is composed of blocks of a predetermined size, the method comprising the steps of: (a) generating blocking information for reducing the blocking effect and ringing information for reducing the ringing noise, from coefficients of predetermined pixels of the upper and left boundary regions of the data block when a frame obtained by deconstructing a bitstream image data for inverse quantization is an intraframe; and (b) adaptively filtering the image data passed through inverse quantization and inverse discrete cosine transform according to the generated blocking information and ringing information.

Preferably, the step (a) further comprises the step of setting the blocking information and ringing information of the previous frame corresponding to a motion vector as blocking information and ringing information of the current frame if the frame is an interframe, and setting the ringing information to "1" which represents the image data requiring filtering if a residual signal of the inverse-quantized current block exists, and the blocking information and ringing information are determined according to coefficients of a pixel A located at the upper left corner of the block, a pixel B located to the right of the pixel A and a pixel C located below the pixel A.

Preferably, the blocking information is constituted of horizontal blocking information and vertical blocking information, and the horizontal blocking information is set to "1" which means the image data requiring filtering when only the coefficient of the pixel A is not equal to "0" or any coefficient of the pixels of the left boundary region of the block is not equal to "0", and the vertical blocking information is set to "1" which means the image data requiring filtering when only the coefficient of the pixel A is not equal to "0" or any coefficient of the pixels of the upper boundary region of the block is not equal to "0", and the ringing information is set to "1" which means the image data requiring filtering when any coefficient of the pixels other than the pixels A, B and C of the block is not equal to "0".

Preferably, the blocking information is constituted of horizontal blocking information and vertical blocking information, and the horizontal blocking information is set to "1" which means the image data requiring filtering when all coefficients of the pixels A, B and C of the block are not equal to "0" or any coefficient of the pixels of the left boundary region of the block is not equal to "0", and the vertical blocking information is set to "1" which means the image data requiring filtering when all coefficients of the pixels A, B and C are not equal to "0" or any coefficient of the pixels of the upper boundary region of the block is not equal to "0", and the ringing information is set to "1" which means the image data requiring filtering when any coefficient of the pixels other than the pixels A, B and C of the block is not equal to "0".

Preferably, in order to reduce the blocking effect, in the step (b), the horizontal (or vertical) filtering is performed using a weighted filter having a predetermined weighted value when the horizontal (or vertical) blocking information of the block is equal to "1" and the ringing information is equal to "0", and when the horizontal (or vertical) blocking information of the block is not equal to "1" or the ringing information is not equal to "0". an absolute value of the difference between adjacent pixels and a Q value used as a dividend for quantizing the block are compared, and then filtering is performed with a predetermined value according to the result of the comparison.

According to another aspect of the present invention, there is provided a signal adaptive filter capable of reducing blocking effect and ringing noise of image data when a frame is composed of blocks of a predetermined size, comprising: a mode flag checking unit for checking a flag to determine whether or not a frame is an intraframe or an interframe when a bitstream image data is deconstructed for inverse quantization; an intra filtering information generator for generating blocking information for reducing the blocking effect and ringing information for reducing the ringing noise, from coefficients of predetermined pixels of the upper and left boundary regions of the data block when the frame is determined as an intraframe by the mode flag checking unit; an inter filtering information generator for setting the blocking information and ringing information of the previous frame corresponding to a motion vector as blocking information and ringing information of the current frame if the frame is an interframe, and setting the ringing information to "1" if a residual signal of the inverse-quantized current block exists; and an adaptive filter for adaptively filtering the image data passed through an inverse quantizer and an inverse discrete cosine transformer according to the blocking information and the ringing information generated by the intra filtering information generator and the inter filtering information generator.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium.

According to still another aspect of the present invention, there is provided a computer readable medium having embodied thereon a computer program for a signal adaptive filtering capable of reducing blocking effect and ringing noise of image data when a frame is composed of blocks of a predetermined size, wherein the signal adaptive filtering comprises the steps of: (a) generating blocking information for reducing the blocking effect and ringing information for reducing the ringing noise, from coefficients of predetermined pixels of the upper and left boundary regions of the data block when a frame obtained by deconstructing a bitstream image data for inverse quantization is an intraframe; (b) setting the blocking information and ringing information of the previous frame corresponding to a motion vector as blocking information and ringing information of the current frame if the frame is an interframe, and setting the ringing information to "1" which represents the image data requiring filtering if a residual signal of the inverse-quantized current block exists; and (c) adaptively filtering the image data passed through the inverse quantization and inverse discrete cosine transform based on the block according to the generated blocking information and ringing information.

Also, there is provided a computer readable medium having embodied thereon a computer program for a method of filtering ringing noise caused when decoding a block-based compressed image data, wherein the ringing noise filtering method comprises the steps of: (a) performing a gradient operation on the block subjected to inverse quantization and inverse discrete cosine transform using predetermined one dimensional horizontal and vertical gradient operators; (b) generating a binary edge map representing whether or not each pixel is an edge pixel, using an absolute value of the difference between the gradient-operated value of one pixel and the value of the adjacent pixel, and a Q value used as a dividend for quantizing the block; and (c) performing a filtering by applying a predetermined filter window to the generated binary edge map.

BEST MODE FOR CARRYING OUT THE INVENTION

Figure 1:
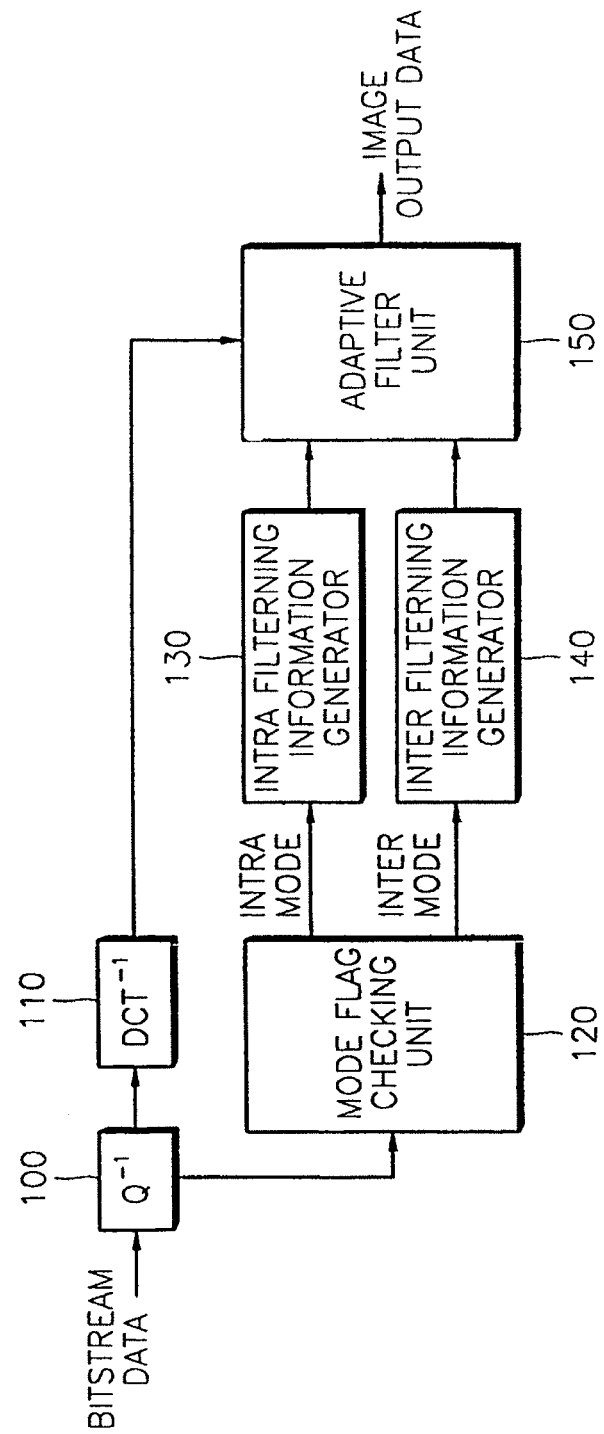
FIG. 1 is a block diagram of a signal adaptive filter for reducing blocking effect and ringing noise according to the present invention.

In FIG. 1, a signal adaptive filter for reducing blocking effect and ringing noise according to the present invention includes a mode flag checking unit 120, an intra filtering information generator 130, an inter filtering information generator 140 and an adaptive filter unit 150. When bitstream image data is deconstructed for inverse quantization, the mode flag checking unit 120 checks whether or not the frame is an intra frame or an inter frame. The intra filtering information generator 130 generates blocking information for reducing blocking effect and ringing information from coefficients of predetermined pixels of the upper and left boundary regions of the data block when the frame is determined as an intra frame by the mode flag checking unit 120. When the mode flag checking unit 120 determines the frame as an inter frame, the inter filtering information generator 140 generates blocking information and ringing information of the previous frame corresponding to a motion vector as blocking information and ringing information of the current frame. If a residual signal of the inverse-quantized current block exists, the ringing information is set to "1". The adaptive filtering unit 150 adaptively filters the image data of the block which has passed an inverse quantizer ($Q^{-1}$) 100 and an inverse discrete cosine transformer ($DCT^{-1}$) 110 according to the blocking information and ringing information generated by the intra filtering information generator 130 and the inter filtering information generator 140.

Figure 2:
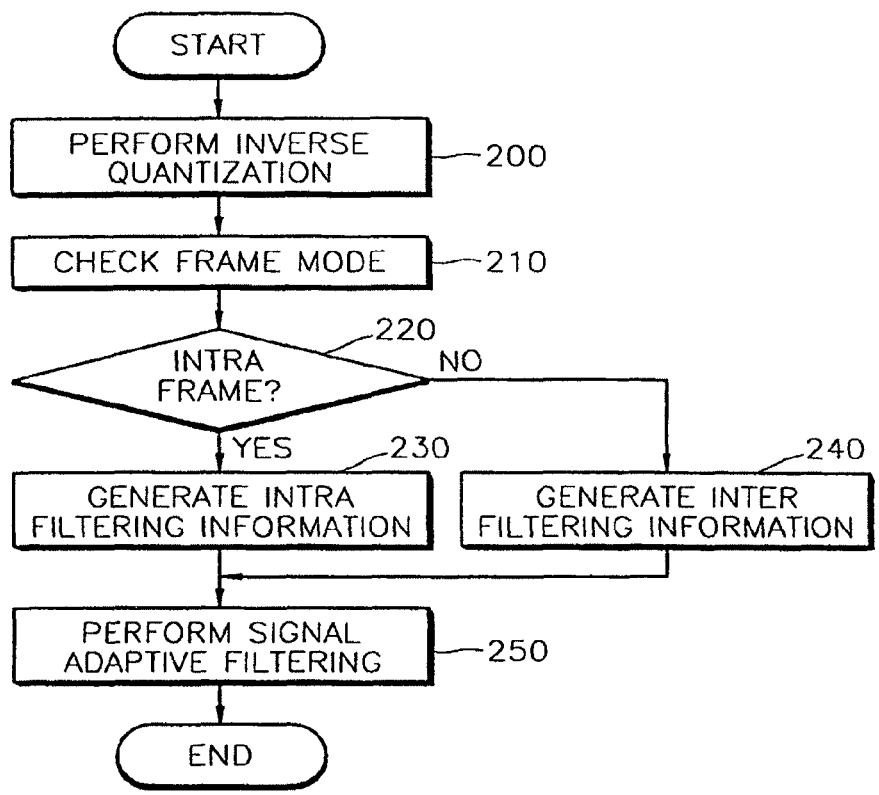
FIG. 2 is a flowchart illustrating a signal adaptive filtering method according to a preferred embodiment of the present invention.
Figure 3:
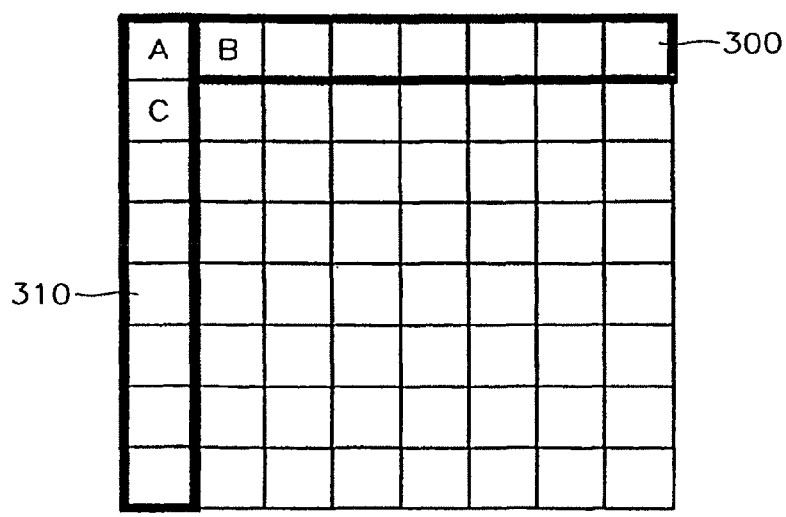
FIG. 3 shows an inverse-quantized block having 8×8 pixels.

Meanwhile, a signal adaptive filtering method according to a preferred embodiment of the present invention will be described. FIG. 2 is a flowchart illustrating the signal adaptive filtering method according to the present invention. Bitstream image data coded by an encoder is decoded by a decoder to be reproduced. To end this, the bitstream data is deconstructed and then inverse-quantized by the inverse quantizer 100 (step 200) Here. the image data is constituted of a plurality of frames, and each frame is constituted of a plurality of blocks. FIG. 3 shows an inverse-quantized block having 8×8 pixels which form the frame.

Before filtering the frame data with the inverse discrete cosine transform (IDCT), a flag is checked in order to make a determination as to whether or not the frame is an intraframe or an interframe (step 210). If the frame is an intraframe (step 220), information used to filter the intraframe is generated (step 230). If the frame is an interframe, information used to filter the interframe is generated (step 240). Then. the frame data which has passed through the IDCT 110 are adaptively filtered according to the generated filtering information, thereby eliminating blocking effect and ringing noise (step 250).

Figure 4:
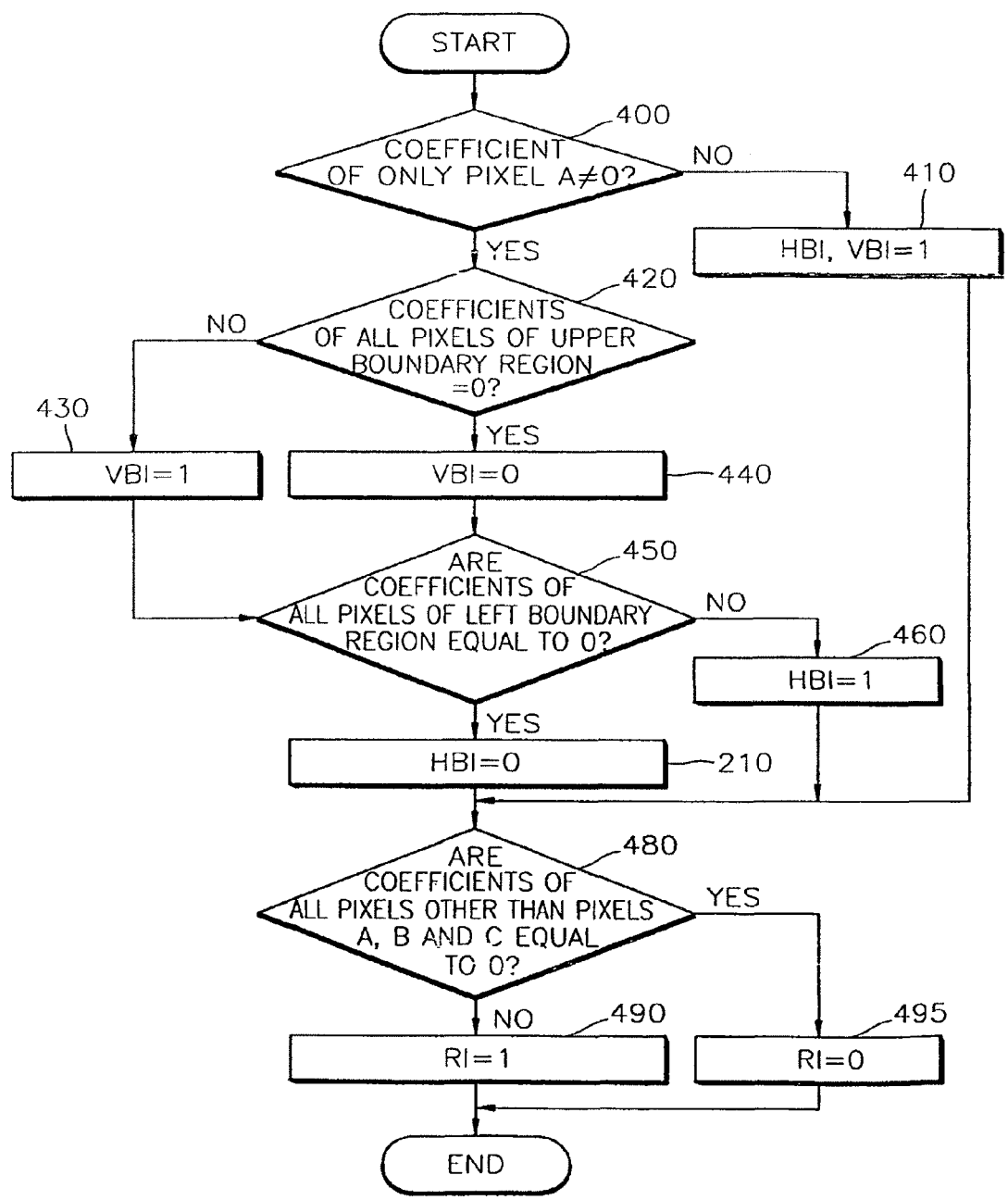
FIG. 4 is a flowchart illustrating the step of generating information used to filter an intraframe.

FIG. 4 is a flowchart illustrating in detail the step of generating information used to filter the intraframe. As shown in FIG. 4, if the frame is determined as an intraframe by the mode flag checking unit 120, the coefficient of pixel A of FIG. 3 is checked (step 400). If only the coefficient of the pixel A is not equal to "0", horizontal blocking information (HBI) and vertical blocking information (VBI) are set to "1" (step 410). If any coefficient of pixels (8 pixels including the pixels A and B) belonging to the upper boundary region 300 of the block shown in FIG. 3 is not equal to "0" (step 420), the VBI is set to "1" (step 430). Otherwise, the VBI is set to "0" (seep 440). Also, if any coefficient of pixels (8 pixels including the pixels A and C) belonging to the left boundary region 310 of the block shown in FIG. 3 is not equal to "0" (step 450), the HBI is set to "1" (step 460). Otherwise, the HBI is set to "0" (seep 470).

After the HBI and VBI are set, ringing information (RI) used to filter the ringing noise is generated. That is, if any coefficient of pixels other than the pixels A, B and C of the block shown in FIG. 3 is not equal to "0" (step 480), the RI is set to "1" (step 490). Otherwise, the RI is set to "0" (step 495). Here, the HBI and VBI are set to "1" when only the coefficient of the pixel A is not equal to "0" (step 400). However, by setting the HBI and VBI to "1" even if all coefficients of the pixels A, B and C are not equal to "0", favorable effect to some extent can be obtained when a signal adaptive filtering is performed later.

Figure 5:
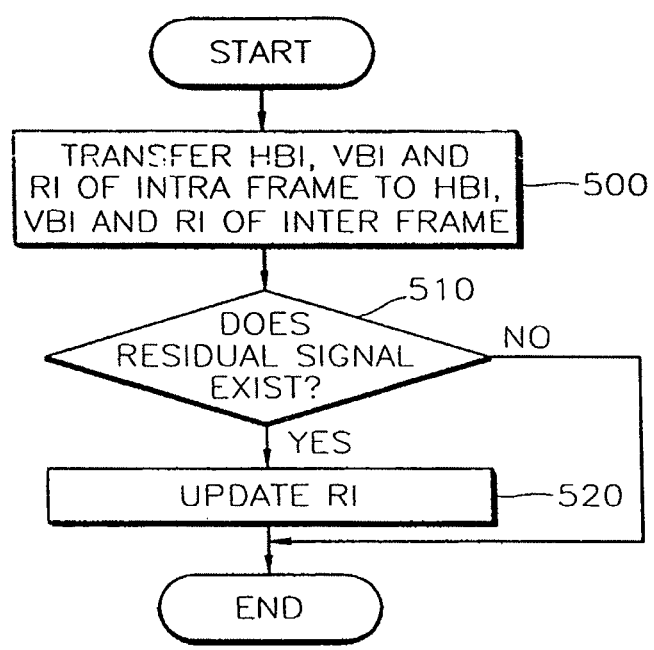
FIG. 5 is a flowchart illustrating the step of generating information used to filter an interframe.

FIG. 5 is a flowchart illustrating the step of generating information used to filter the interframe. If the frame is determined as an interframe by the mode flag checking unit 120, the HBI, VBI and RI of the intraframe are transferred to HBI, VBI and RI of the interframe according to the motion vector (step 500). Also, if a residual signal exists after motion compensation (step 510), the RI is updated (step 520).

Figure 6:
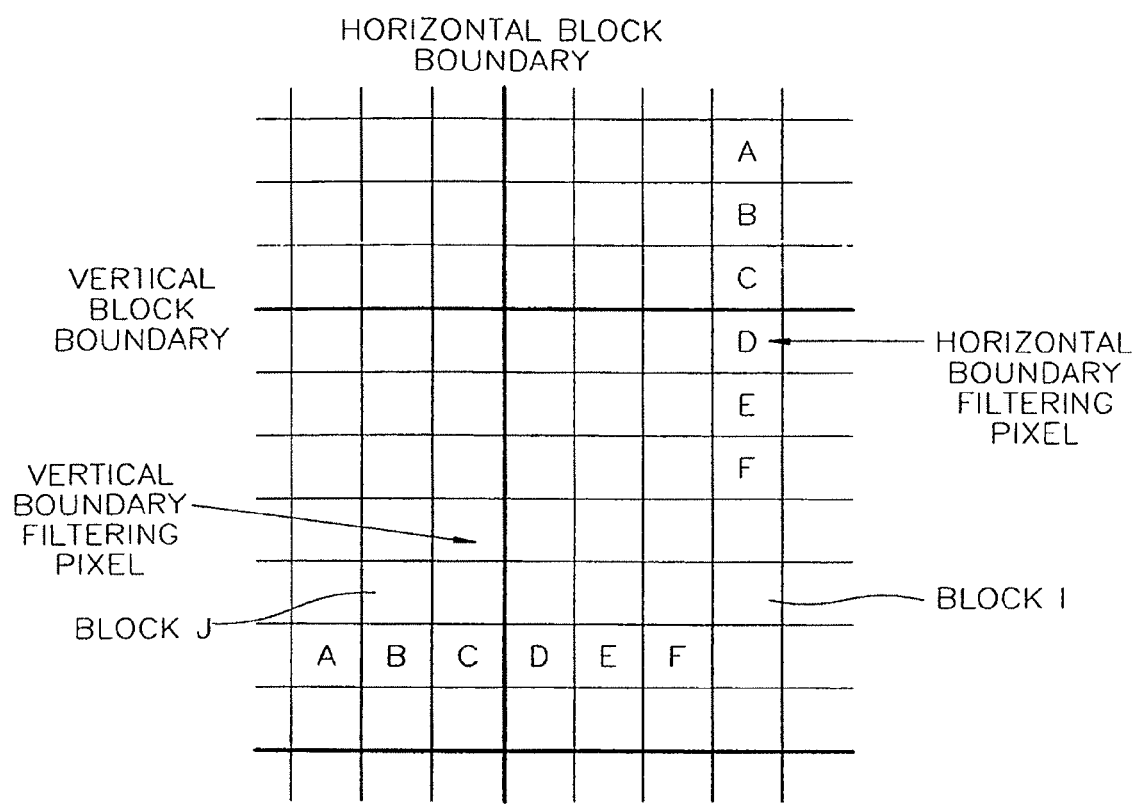
FIG. 6 shows the location of pixels adjacent to the block boundary for illustrating the filtering for reducing blocking effect.

When the blocking information and ringing information for filtering are generated as described above, filtering is adaptively performed according to the information. First, a filtering method for reducing blocking effect will be described. The filtering for reducing the blocking effect is classified as one of horizontal filtering and vertical filtering. Here, the horizontal filtering will be explained. FIG. 6 shows the location of pixels adjacent to the block boundary, for illustrating the filtering for reducing the blocking effect. A determination is made as to whether or not the HBI and RI of blocks I and J of FIG. 6 are equal to "0". If the HBI and RI of blocks I and J of FIG. 6 are equal to "0", a weighted filtering is performed on pixels A, B, C, D, E and F of FIG. 6 using a 7-tap (1, 1, 1, 2, 1, 1, 1) low-pass filter (LPF).

If the HBI or the RI of blocks I and J of FIG. 6 is not equal to "0", a filtering is performed on the pixels B, C, D and E using the following algorithm.

```
d = D−C
If (ABS(d) ≤ Q) {
    D = D − (d/2);           C = C + (d/2);
    d = E − D;
    if (ABS(d) ≤ Q)          E = E − (d/4);
    d = C − B;
    if (ABS(d) ≤ Q)          B = B + (d/4);
}
else {
    If (ABS(d/2) ≤ 2Q)
        If (d > 0) {
            D = D − (Q − ABS(d/2));
            C = C + (Q − ABS(d/2));
        }
        else {
            D = D + (Q − ABS(d/2));
            C = C + (Q − ABS(d/2));
        }
        d = E − D;
        if (ABD(d) ≤ Q)      E = E − (d/4);
        d = C − B;
        if (ABS(d) ≤ Q)      B = B − (d/4);
    }
}
```

In the above algorithm, ABS represents an absolute value, and Q represents a dividend used when the blocks forming the frame are quantized.

In detail, the absolute value (ABS(d)) of the difference (d) between the pixels D and C is equal to or less than Q, the current pixel value of the pixel D is set by subtracting d/2 from the current pixel value, and the current pixel value of the pixel C is set by adding d/2 to the current pixel value. Also, the absolute value (ABS(d)) of the difference (d) between the pixels E and D is equal to or less than Q, the current pixel value of the pixels is set by subtracting d/4 from the current pixel value. Also, if the absolute value (ABS(d)) of the difference (d) between the pixels C and B is equal to or less than Q, the current pixel values of the pixel B is set by subtracting d/4 from the current pixel value. In the same manner as the above, the pixel values of the pixels B, C, D and E are set according to the algorithm other than the above, which is obvious to those skilled in the art, thus the explanation thereof will be omitted. Also, vertical filtering is performed according to the same principle as the horizontal filtering.

Next, a filtering method for reducing ringing noise will be described. First, the generated ringing information is checked. If the ringing information is set to "1", the filtering is performed. Otherwise, the filtering is not performed. To end this, edge pixels of the block which have been subjected to inverse quantization and IDCT are determined. In order to determine the edge pixels, a gradient operation is performed on the blocks which have been subjected to inverse quantization and IDCT using one-dimensional horizontal and vertical gradient operators.

Figure 7:
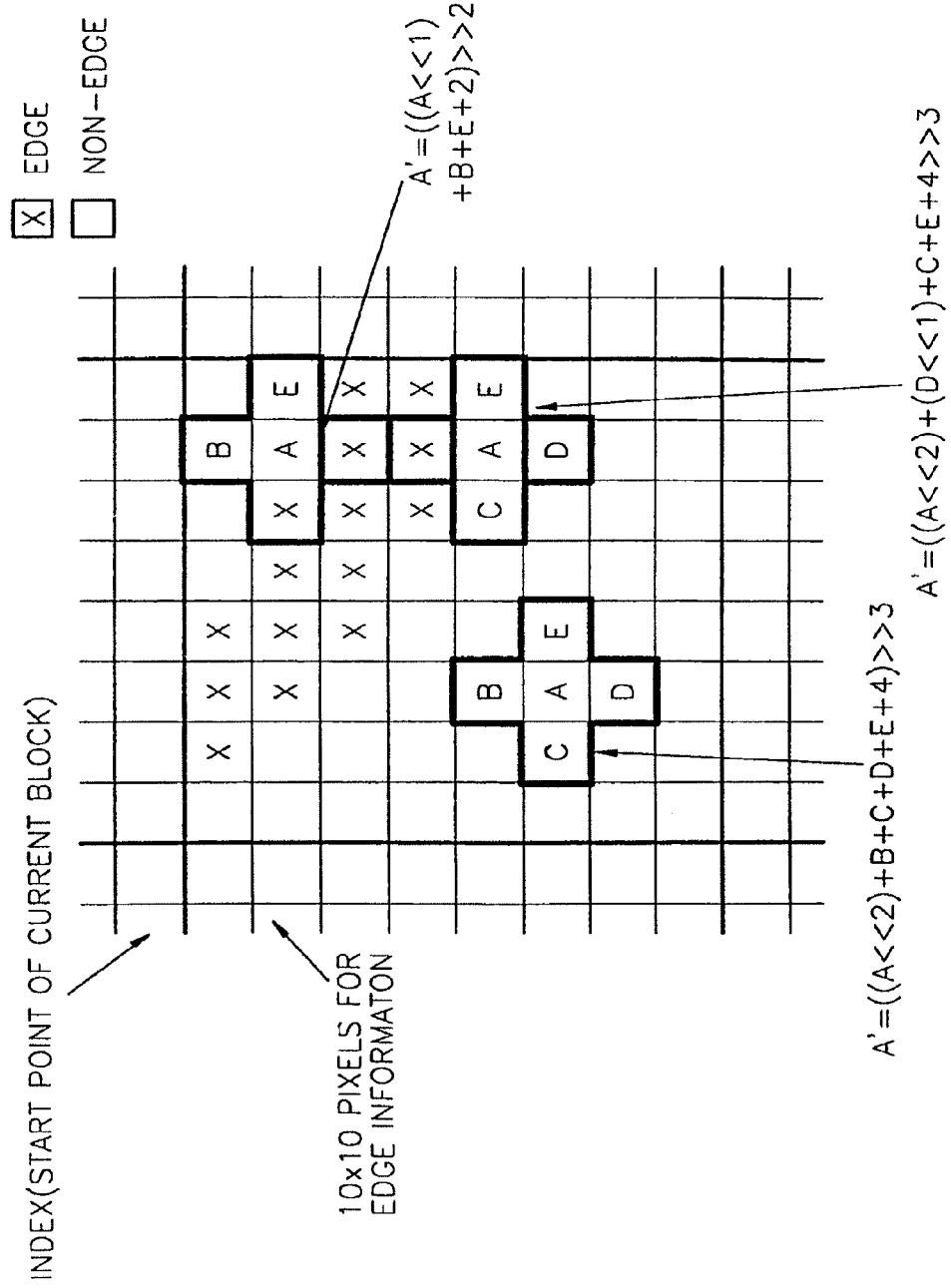
FIG. 7 shows the location of pixels to be processed in the current block.

Then, an absolute value of the difference between one gradient-operated pixel value and the adjacent pixel value, and Q value used as a dividend when quantizing the block, are used to generate a binary edge map representing the edge of each pixel. Here, the block has 8×8 pixels, and the size of the binary edge map is represented as a two-dimensional array edge[10][10] as shown in FIG. 7.

In order to generate the binary edge map, vertical edge detection and horizontal edge detection are performed. Algorithms for vertical edge and horizontal edge detections are as follows.

/* Vertical edge detection*/
A1=ABS(PtrImage[0]−PtrImage[1]);
A2=ABS(PtrImage[0]−PtrImage[1]);
if (((A1>Th)&&(A2>Th))||(A1>5*Th/2)||(A2>5*Th/2))
Edge[m][n]=1; /* edge*/
else {/* Horizontal edge detection*/
A'1=ABS(PtrImage[0]−PtrImage[width]);
A'2=ABS(PtrImage[0]−PtrImage[−width]);
if (((A'1>Th)&&(A'2>Th)||(A'1>5*Th/2)||(A'2)>5*Th/2))
  Edge [m][n]=1; /* edge*/

For the vertical edge detection, an absolute value (A1) of the difference between the gradient-operated results of the pixel (PtrImage[0]) on which a determination as to whether or not the pixel is an edge of the block is made, and the right pixel (PtrImage([I]) of the pixel (PtrImage[0]) is calculated. Then, an absolute value (A2) of the difference between the gradient-operated results of the PtrImage[0] and the left pixel (PtrImage[−1]) of the pixel (PtrImage[0]) is calculated. Then, a determination as to whether or not the pixel is an edge is made according to the logic values obtained after the absolute values A1 and A2 are compared with a predetermined threshold value Th, and then the above process is performed on all pixels of the block. The vertical edge detection is performed according to a logical formula of (A1>Th)&&(A2>Th)|| (A1>5*Th/2)||(A2)>5*Th/2). If the logical formula is true, the pixel is determined as a vertical edge. Otherwise, the pixel is determined to not be a vertical edge.

The horizontal edge detection is performed according to the same principle of the horizontal edge detection. First, an absolute value (A'1) of the difference between the gradient-operated results of the pixel (PtrImage[0]) on which a determination as to whether or not the pixel is edge of the block is made, and the lower pixel (PtrImage[width]) of the pixel (PtrImage[0]) is calculated. Then, an absolute value (A'2) of the difference between the gradient-operated results of the pixel (PtrImage[0]) and the upper pixel (PtrImage[−width]) of the pixel (PtrImage[0]) is calculated. Then, a determination as to whether or not the pixel is an edge is made according to the logic values obtained after the absolute values A'1 and A'2 are compared with a predetermined threshold value Th, and then the above process is performed on all pixels of the block. The horizontal edge detection is performed according to a logical formula of (A'1>Th)&&(A'2>Th)||(A'1>5*Th/2)|| (A'2)>5*Th/2). If the logical formula is true, the pixel is determined as a horizontal edge. Otherwise, the pixel is determined to not be a horizontal edge. Here, '&&' represents logical AND, and '||' represents logical OR.

Next, filtering is performed by applying a predetermined filter window to the generated binary edge map. The filtering may be performed by a general filtering method by applying a filter window having a predetermined size. However, in this embodiment, filtering is not performed if the central pixel of the filter window is an edge, while the filtering is performed if the central pixel is not an edge. The filter window may be a general filter window. In this embodiment, a 4-connectivity filter window having five pixels arranged in a cross shape centering one central pixel, as shown in FIG. 7, is used. In FIG. 7, X represents an edge pixel, and the regions other than the regions with "X" represent non-edge pixels.

Also, if the filter window has no edge pixel, ordinary filtering is performed, while weighted filtering is performed if the edge pixel exists. An example of weighted filtering is shown in FIG. 7. In FIG. 7, "<<" represents a shift to the left, and ">>" represents a shift to the right.

The invention may be embodied in a general purpose digital computer that is running a program from a computer usable medium, including but not limited to storage media such as magnetic storage media (e.g., ROM's, floppy disks, hard disks, etc.), optically readable media (e.g., CD-ROMs, DVDs, etc.) and carrier waves (e.g., transmissions over the Internet). Hence, the present invention may be embodied as a computer usable medium having a computer readable program code unit embodied therein for signal adaptive filtering, the computer readable program code means in the computer usable medium comprising: computer readable program code means for causing a computer to effect generating blocking information for reducing the blocking effect and ringing information for reducing the ringing noise, from coefficients of predetermined pixels of the upper and left boundary regions of the data block when a frame obtained by deconstructing a bitstream image data for inverse quantization is an intraframe; computer readable program code means for causing a computer to effect setting the blocking information and ringing information of the previous frame corresponding to a motion vector as blocking information and ringing information of the current frame if the frame is an interframe, and setting the ringing information to "1" which represents the image data requiring filtering if a residual signal of the inverse-quantized current block exists; and computer readable program code means for causing a computer to effect adaptively filtering the image data passed through the inverse quantization and inverse discrete cosine transform based on the block according to the generated blocking information and ringing information, for instance. A functional program, code and code segments, used to implement the present invention can be derived by a skilled computer programmer from the description of the invention contained herein.

INDUSTRIAL APPLICABILITY

As described above, the present invention can remove the blocking noise and the ringing noise from an image restored from an image compressed based on blocks, thereby enhancing the image restored from compression.

What is claimed is:

1. An image data filtering method for reducing blocking effect, the method comprising:
   obtaining transformed coefficients of a data block;
   checking whether any coefficient having a non-zero value exists in the data block;
   generating filtering information indicating whether to perform deblocking filtering for the data block according to whether any coefficient having a non-zero value exists in the data block; and
   filtering a boundary pixel of the data block passed through inverse quantization and inverse transform according to the generated filtering information.

* * * * *